3,462,535
COMPOSITIONS AND METHODS FOR PRODUCING SEDATIVE - TRANQUILIZING ACTIVITY WITH MALONAMIDIC ACID ESTERS

Bernard Loev, Broomall, and Edward Macko, Philadelphia, Pa., assignors to Smith Kline & French Laboratories, Philadelphia, Pa., a corporation of Pennsylvania
No Drawing. Filed Feb. 11, 1966, Ser. No. 526,712
Int. Cl. A61k 27/00; C07c 103/20
U.S. Cl. 424—309                                10 Claims

ABSTRACT OF THE DISCLOSURE

Sedative-tranquilizer compositions and methods employing malonamidic acid esters.

---

This invention relates to new central nervous system depressant compositions, in particular, to new sedative-tranquilizer compositions and to a method of producing central nervous system depressant, in particular sedative-tranquilizing, activity. In addition, this invention relates to new methyl α-ethyl-α-phenylmalonamidates having sedative-tranquilizing activity.

The sedative-tranquilizer compositions of this invention comprise, in dosage unit form, a pharmaceutical carrier and a malonamidic acid ester of the formula:

FORMULA I

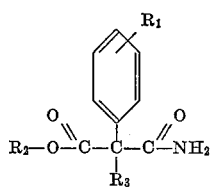

in which:

$R_1$ is hydrogen, chloro, bromo, fluoro, trifluoromethyl, nitro, lower alkyl, lower alkoxy, lower alkoxycarbonyl or the like;
$R_2$ is lower alkyl and
$R_3$ is lower alkyl having 2–3 carbon atoms.

The malonamidic acid esters of Formula I may be used as the $dl$ mixture or as the separated $d$ or $l$ optical isomers.

The preferred compositions of this invention contain as the active ingredient a malonamidic acid ester of Formula I in which $R_1$ is hydrogen and $R_3$ is ethyl.

A particularly advantageous composition of this invention consists of, in dosage unit, a pharmaceutical carrier and methyl α-ethyl-α-phenylmalonamidate.

The compositions of this invention contain a malonamidic acid ester of Formula I in an amount of from about 125 mg. to about 1000 mg., preferably from about 50 mg. to about 500 mg. per dosage unit.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule or a liquid suspension.

A method in accordance with this invention comprises administering internally to an animal organism in an amount sufficient to produce sedative-tranquilizing activity a malonamidic acid ester of Formula I. The active ingredient will be administered in a dosage unit form as described above. The route of administration may be orally or parenterally, the oral route being preferred. Advantageously, the active ingredient will be administered in a total daily dosage of from about 125 mg. to about 3000 mg., preferably from about 250 mg. to about 1000 mg. When the administration is carried out as described above a sedative-tranquilizing activity is produced.

The new methyl α-ethyl-α-phenylmalonamidates which are also objects of this invention are represented by the following formula:

FORMULA II

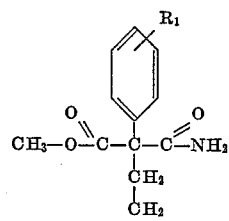

in which $R_1$ is hydrogen, chloro, bromo, fluoro, trifluoromethyl, nitro, lower alkyl, lower alkoxy, lower alkoxycarbonyl or the like.

The compound of Formula II in which $R_1$ is hydrogen is particularly advantageous. The activity of this compound in the test in rats for activity against Metrazol induced convulsions, which is activity indicative of tranquilizers, demonstrates the superior properties of the methyl ester over the next higher alkyl ester, that is, the ethyl ester. The $ED_{50}$ is the dose at which 50% of the animals are protected against Metrazol induced convulsions.

| | Metrazol antagonism |
|---|---|
| 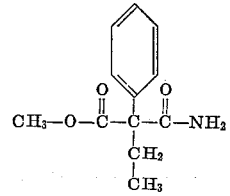 | $ED_{50}=24$ mg./kg. (complete abolition of Metrazol induced convulsions at this dose in 50% of the animals tested). |
| 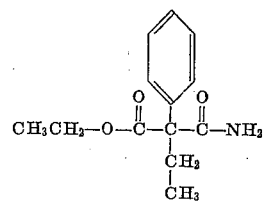 | $ED_{50}=52$ mg./kg. (only partial protection from Metrazol induced convulsions at this dose in 50% of the animals tested). |

Thus, comparing the $ED_{50}$'s methyl α-ethyl-α-phenylmalonamidate, which is a new compound, is more than twice as active in this test as ethyl α-ethyl-α-phenyl malonamidate, which is reported as an intermediate in U.S. 3,104,201. In addition, the methyl ester is advantageous because at 24 mg./kg. it completely abolished Metrazol induced convulsions in 50% of the animals tested while the ethyl ester at 52 mg./kg. provided only partial protection in 50% of the animals tested.

The malonamidic acid esters are prepared by procedures such as the following:

(I)

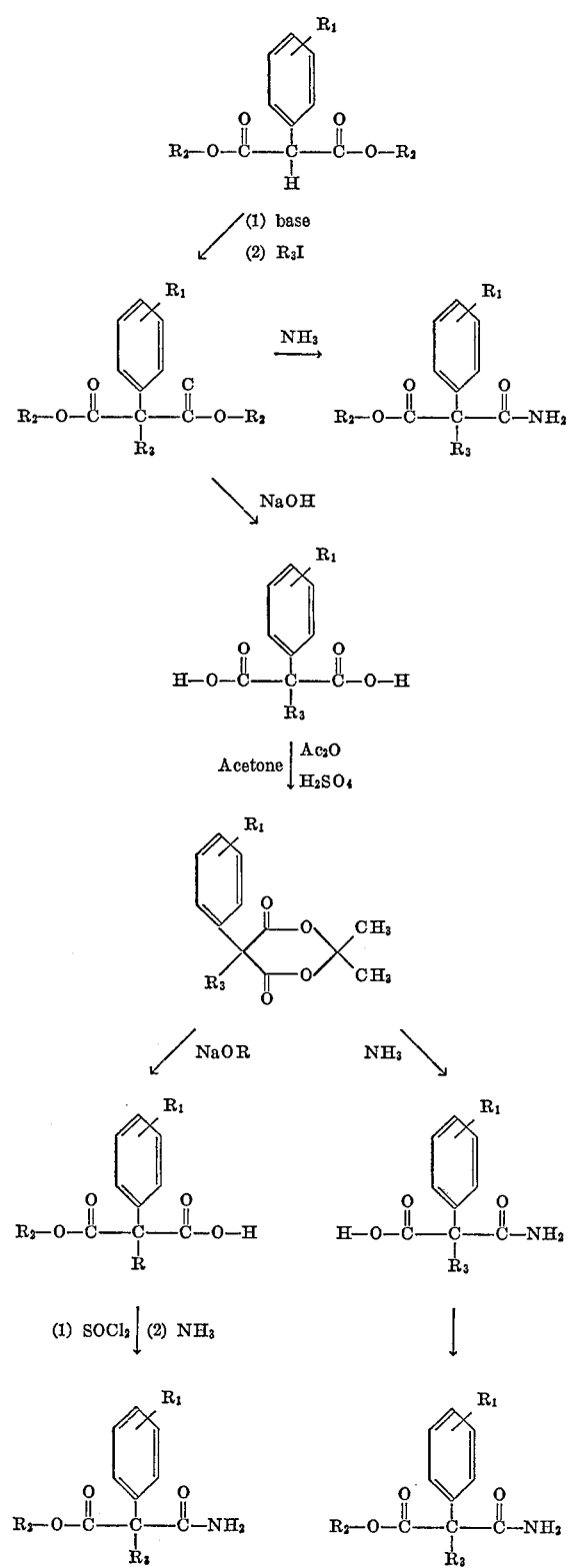

(II)

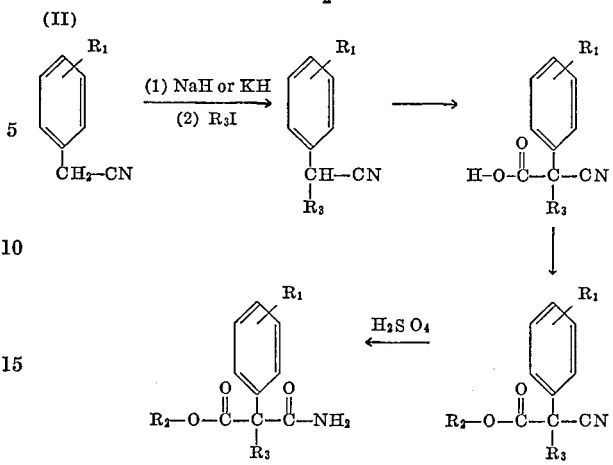

The terms $R_1$, $R_2$ and $R_3$ are as defined above.

According to procedure I, a α-phenylmalonic acid diester is treated with a base sodium methoxide, sodium hydride, sodium hydroxide or potassium hydroxide to give the anion which is reacted with $R_3$-iodide to give the α-$R_3$-α-phenylmalonic acid diester. The diester is saponified to give the corresponding malonic acid by treating with aqueous sodium hydroxide. The α-$R_3$-α-phenylmalonic acid is treated with acetic anhydride and sulfuric acid to give the 2,2-dimethyl-4,6-dioxo-1,3-dioxane which is treated with a sodium lower alkoxide to give the α-$R_3$-α-phenylmalonic acid mono-lower alkyl ester. The carboxylic acid group is converted to the carbonyl chloride with thionyl chloride and the carbonyl chloride compound is treated with ammonia to give the α-$R_3$-α-phenylmalonamidic acid ester.

Alternatively, the 2,2-dimethyl-4,6-dioxo-1,3-dioxane is treated with ammonia to give the α-$R_3$-α-phenylmalonamidic acid which is esterified to give the α-$R_3$-α-phenylmalonamidic acid ester.

According to procedure II, a phenylacetonitrile is treated with sodium or potassium hydride, followed by $R_3$-iodide to give the α-$R_3$-phenylacetonitrile. This acetonitrile is treated with sodium or potassium hydride in a solvent, such as tetrahydrofuran, and then carbon dioxide is passed into the mixture to give the α-cyano-α-$R_3$-phenylacetic acid. The carboxylic acid group is esterified, for example, to give the methyl ester with diazomethane or using methyl iodide and sodium hydroxide. Treating the α-cyano-α-$R_3$-phenylacetic acid ester with sulphuric acid gives the α-$R_3$-α-phenylmalonamidic acid ester.

The terms "lower alkyl" and "lower alkoxy" where used herein denote groups having about 1-4 carbon atoms.

The following examples are not limiting but are illustrative of the invention.

Example 1

Diethyl α-ethyl-α-phenylmalonate (104 g.) is dissolved in 200 ml. of water and 80 ml. of methanol and 120 g. of solid sodium hydroxide is added. The mixture is heated on a steam bath, with stirring, for 17 hours. After one hour a white solid forms. Methanol (40 ml.) is added, the mixture is chilled and filtered. The solid material is washed with methanol and dissolved in about 100 ml. of water. Concentrated hydrochloric acid is added until a pH of 1 is reached. The precipitate is filtered off and washed with water to give α-ethyl-α-phenylmalonic acid.

To a suspension of 59.0 g. of α-ethyl-α-phenylmalonic acid in 85 ml. of acetic anhydride is added 4.3 ml. of concentrated sulfuric acid dropwise with stirring. The mixture is cooled to 10° C. on an ice-bath and 70 ml. of dry acetone is added at 10–12° C. over a period of 10 minutes. The mixture is stirred at room temperature for 75 minutes. The mixture is chilled and filtered. The solid material obtained is washed with cold water and recrystallized from acetone-water and dried in a vacuum oven at 40° C. to give 5-ethyl-2,2-dimethyl-4,6-dioxo-5-phenyl-1,3-dioxane.

A solution of 30.0 g. of 5-ethyl-2,2-dimethyl-4,6-dioxo-5-phenyl-1,3-dioxane in 200 ml. of absolute methanol is added to a solution of 6.54 g. sodium methoxide in 100 ml. of methanol. The mixture is stirred for 15 minutes at room temperature, then concentrated to dryness on a water bath. Water (200 ml.) is added and the mixture is filtered. The filtrate is chilled, made strongly acidic with concentrated hydrochloric acid and filtered to give the monomethyl ester of α-ethyl-α-phenylmalonic acid.

To 20.0 g. of the monomethyl ester of α-ethyl-α-phenylmalonic acid is added 60 ml. of thionyl chloride. The mixture is refluxed, with stirring, for 1.5 hours. The mixture is concentrated and the residue is dissolved in 150 ml. of dry ether. Anhydrous ammonia is passed through the solution with stirring for 30 minutes. The mixture is allowed to stand at room temperature for three hours and filtered. The filtrate is evaporated to dryness. The solid residue is dissolved in hot isopropyl ether, treated with charcoal, filtered and chilled. The precipitate is filtered off to give methyl α-ethyl-α-phenylmalonamidate.

Alternatively, a mixture of 5.0 g. of diethyl α-ethyl-α-phenylmalonate and 100 ml. of methanolic ammonia is heated on a steam bath for four days to give, after concentrating and recrystallizing from isopropyl ether methyl α-ethyl-α-phenylmalonamidate.

Example 2

A mixture of 24.8 g. of α-(p-chlorophenyl)malonic acid and 30 g. of thionyl chloride is heated at reflux. The excess thionyl chloride is removed in vacuo. The residue is treated with excess ethanol to give, on distillation, diethyl α-(p-chlorophenyl)malonate.

Ten grams of diethyl α-(p-chlorophenyl)malonate is added to a mixture of 1.0 g. of sodium and 35 ml. of ethanol at 0° C. Ethyl iodide (6.0 g.) is added and the resulting mixture is heated at reflux for five hours, then cooled and poured into water. The mixture is extracted with ether. The ether extracts are concentrated and distilled in vacuo to give diethyl α-(p-chlorophenyl)-α-ethylmalonate.

A solution of 16.2 g. of sodium hydroxide in 30 ml. of water is added to 157 g. of diethyl α-(p-chlorophenyl)-α-ethylmalonate. The mixture is heated for two hours, then cooled and acidified. Extracting with ether, removing the ether from the extracts, adding petroleum ether to the residue and filtering gives α-(p-chlorophenyl)-α-ethylmalonic acid.

A mixture of 8.0 g. of α-(p-chlorophenyl)-α-ethylmalonic acid, 9.9 ml. of acetic anhydride, 0.5 ml. of sulfuric acid and 9.9 ml. of acetone is stirred at room temperature for 1.5 hours, then poured onto ice. An oil separates and crystallizes to give 5-(p-chlorophenyl)-5-ethyl-2,2-dimethyl-4,6-dioxo-1,3-dioxane.

To a solution of 1.2 g. of sodium methoxide in methanol is added 6.1 g. of 5-(p-chlorophenyl)-5-ethyl-2,2-dimethyl-4,6-dioxo-1,3-dioxane in 50 ml. of methanol. The resulting mixture is stirred at room temperature for 15 minutes to give the monomethyl ester of α-(p-chlorophenyl)-α-ethylmalonic acid.

A mixture of 4.7 g. of the monomethyl ester of α-(p-chlorophenyl)-α-ethylmalonic acid and 25 ml. of thionyl chloride is refluxed for 1.5 hours, then concentrated and dissolved in dry ether. Anhydrous ammonia is passed through the solution at 5° C. The mixture is filtered; the filtrate is concentrated and the solid residue is recrystallized to give methyl α-(p-chlorophenyl)-α-ethylmalonamidate.

Example 3

Methyl α-ethyl-α-phenylmalonamidate (9.8 g.), prepared as in Example 1, is added to 52 g. of concentrated sulfuric acid at 70° C. To the mixture is added a solution of 2.9 ml. of fuming nitric acid in 13 ml. of concentrated sulfuric acid for 30 minutes at 0° C. The mixture is stirred for one hour and poured on ice, then extracted with methylene dichloride and concentrated to give a mixture of o- and p-isomers which are separated, by fractional crystallization from carbon tetrachloride, to give methyl α-ethyl-α-(p-nitrophenyl)malonamidate and methyl α-ethyl-α-(o-nitrophenyl)malonamidate.

Example 4

By the procedure of Example 1 using, in place of diethyl α-ethyl-α-phenylmalonate, the following:

diethyl α-ethyl-α-(o-methoxyphenyl)malonate
diethyl α-ethyl-α-(m-methoxyphenyl)malonate
diethyl α-ethyl-α-(p-tolyl)malonate the products are, respectively:

methyl α-ethyl-α-(o-methoxyphenyl)malonamidate
methyl α-ethyl-α-(p-methoxyphenyl)malonamidate
methyl α-ethyl-α-(p-tolyl)malonamidate.

Example 5

By the procedure of Example 2, using in place of p-chlorophenylmalonic acid, the following:

o-chlorophenylmalonic acid
m-chlorophenylmalonic acid
o-bromophenylmalonic acid
m-bromophenylmalonic acid the products are, respectively:

methyl α-(o-chlorophenyl)-α-ethylmalonamidate
methyl α-(m-chlorophenyl)-α-ethylmalonamidate
methyl α-(o-bromophenyl)-α-ethylmalonamidate
methyl α-(m-bromophenyl)-α-ethylmalonamidate.

Example 6 p-Trifluoromethylphenylacetic acid (14 g.) is suspended in 50 ml. of thionyl chloride and the mixture is heated at reflux for one hour. Volatile materials are removed in vacuo and the residual acid chloride is slowly added to 50 ml. of liquid ammonia. The excess ammonia is allowed to evaporate and the solid residue is washed with water to give p-trifluoromethylphenylacetamide.

p-Trifluoromethylphenylacetamide (11 g.) is dissolved in 30 ml. of thionyl chloride and the resulting solution is refluxed for one hour. Excess thionyl chloride is removed by distillation and the residual oil is distilled to give p-trifluoromethylphenylacetonitrile.

To a mixture of 1.0 g. of sodium in 35 ml. of ethanol at 0° C. is added 6.0 g. of p-trifluoromethylphenylacetonitrile. Ethyl iodide (6.0 g.) is added and the mixture is heated at reflux for five hours, then cooled and poured into water. Extracting with ether and concentrating and distilling in vacuo gives α-ethyl-p-trifluoromethylphenylacetonitrile.

A mixture of 3.2 g. of α-ethyl-p-trifluoromethylphenylacetonitrile and 10 ml. of tetrahydrofuran is added to a suspension of 1.8 g. of 40% potassium hydride (in oil) in 15 ml. of tetrahydrofuran. Carbon dioxide is passed into the mixture. The solvent is removed in vacuo; the residue is dissolved in water and washed with ether. The aqueous solution is acidified with hydrochloric acid. The organic layer is separated and solvent distilled off to give α-cyano-α-ethyl-p-trifluoromethylphenylacetic acid.

The above prepared acid is treated with an excess of diazomethane in ether. The mixture is stirred at room temperature for 30 minutes, then concentrated and distilled to give methyl α-cyano-α-ethyl-p-trifluoromethylphenylacetate.

Five grams of the above prepared cyano ester is poured into 50 ml. of concentrated sulfuric acid at 90° C. The mixture is heated at 90–100° C. for 10 minutes, then is poured onto ice. The precipitate is filtered off and recrystallized from isopropyl ether to give methyl α-ethyl-α-(p-trifluoromethylphenyl)malonamidate.

Example 7

By the procedure of Example 6 using, in place of p-trifluoromethylphenylacetonitrile, the following:

p-ethylphenylacetonitrile
p-(t-butyl)phenylacetonitrile
p-fluorophenylacetonitrile
m-ethoxyphenylacetonitrile the products are, respectively:

methyl α-ethyl-α-(p-ethylphenyl)malonamidate
methyl α-ethyl-α-[p-(t-butyl)phenyl]malonamidate
methyl α-ethyl-α-(p-fluorophenyl)malonamidate
methyl α-ethyl-α-(m-ethoxyphenyl)malonamidate.

Example 8

A mixture of 5 g. of methyl α-ethyl-α-(p-nitrophenyl)malonamidate (prepared as in Example 3), 30 ml. of methanol and 1 g. of 10% palladium-on-charcoal is hydrogenated for about four hours, then filtered, concentrated and distilled to give methyl α-ethyl-α-(p-aminophenyl)malonamidate.

The above prepared p-aminophenylmalonamidate is diazotized by dissolving it in a solution of concentrated hydrochloric acid, water and ice and treating with sodium nitrite in water at about 0° C. Cuprous cyanide in concentrated hydrochloric acid and water is added at about 0° C. The mixture is stirred at room temperature for two hours, then heated to 60° C. Extracting into ether, then concentrating the ether extracts gives methyl α-ethyl-α-(p-cyanophenyl)malonamidate.

Three grams of methyl α-ethyl-α-(p-cyanomethyl)malonamidate is dissolved in 100 ml. of methanol. Hydrogen bromide is passed into the solution for 15 minutes. The mixture is filtered and the filtrate is concentrated, treated with water and warmed on a steam bath. The organic layer is distilled to give methyl α-(p-methoxycarbonyl)phenyl-α-ethylmalonamidate.

Example 9

Diethyl α-phenylmalonate (5.0 g.) is added to an aqueous ethanol solution containing 1.2 g. of sodium hydroxide. Five grams of propyl iodide is added and the resulting mixture is heated at reflux for five hours. The mixture is cooled, then poured into water and extracted with ether. Concentrating and distilling the ether extracts gives diethyl α-phenyl-α-propylmalonate.

By the procedure of Example 2, using the above prepared diethyl α-phenyl-α-propylmalonate, the product is methyl α-phenyl-α-propylmalonamidate.

Example 10

α-Ethyl-α-phenylacetonitrile (100 g.) in 200 ml. of tetrahydrofuran is added to a suspension of 70 g. of 40% potassium hydride in 500 ml. of tetrahydrofuran. After the hydrogen evolution ceases, carbon dioxide is bubbled in for 20 minutes. The tetrahydrofuran is evaporated in vacuo. The residue is dissolved in water, extracted with ether and the aqueous layer is acidified. The resulting oil is α-cyano-α-ethyl-α-phenylacetic acid.

The above prepared cyanoacetic acid is added to one equivalent of quinine in methanol. On chilling the salt forms and is filtered off and recrystallized several times from chloroform. The salt is treated with dilute hydrochloric acid and extracted out with ether. Evaporating the ether from the extracts gives l-α-cyano-α-ethylphenylacetic acid.

The combined filtrates of the above resolution are acidified with hydrochloric acid and filtered to give crude d-α-cyano-α-ethylphenylacetic acid. This is dissolved in ether and l-phenylisopropylamine is added. The resulting salt is recrystallized from chloroform-ether, dissolved in water, acidified with hydrochloric acid and extracted with ether to give the d-α-cyano-α-ethylphenylacetic acid.

The resolved acids are each treated with diazomethane in ether. After concentrating, the methyl ester is isolated as an oil.

Each of the above prepared methyl esters is treated as follows: 5.0 g. is added to 50 ml. of concentrated sulfuric acid at 90° C. The mixture is kept at 90–100° C. for ten minutes then poured onto ice. The solid is recrystallized from isopropyl ether to give l-methyl-α-ethyl-α-phenylmalonamidate and d-methyl-α-phenylmalonamidate.

Example 11

| Ingredients: | Amounts (mg.) |
|---|---|
| Methyl-α-ethyl-α-phenylmalonamidate | 125 |
| Sucrose | 100 |
| Starch | 25 |
| Talc | 5 |
| Stearic acid | 2 |

The active ingredient and the sucrose are mixed and granulated with 10% gelatin solution. The wetted mass is screened and dried. The granules are mixed with the starch, talc and stearic acid, screened and then compressed into a tablet.

One tablet is administered three times a day.

Example 12

A tablet is made as described in Example 11 using as the active ingredient ethyl α-ethyl-α-phenylmalonamidate (250 mg.).

Example 13

| Ingredients: | Amounts (mg.) |
|---|---|
| Methyl α-ethyl-α-(p-nitrophenyl)malonamidate | 300 |
| Lactose | 75 |

The ingredients are screened, mixed and filled into a hard gelatin capsule.

Example 14

| Ingredients: | Amounts (mg.) |
|---|---|
| Methyl α-(p-chlorophenyl)-α-ethylmalonamidate | 400 |
| Peanut oil | 100 |

The ingredients are mixed into a slurry and filled into a soft gelatin capsule.

Example 15

| Ingredients: | Amounts (mg.) |
|---|---|
| Methyl α-ethyl-α-phenylmalonamidate | 250 |
| Lactose | 75 |
| Magnesium stearate | 5 |

The ingredients are mixed and filled into a hard gelatin capsule.

What is claimed is:

1. A dosage unit in the form of a tablet, capsule, troche, lozenge or parenteral solution for administration to produce sedative-tranquilizing activity comprising a pharmaceutical carrier and from about 125 mg. to about 1000 mg. of a malonamidic acid ester of the formula:

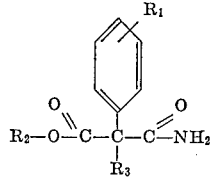

in which:

$R_1$ is hydrogen, chloro, bromo, fluoro, trifluoromethyl, nitro, lower alkyl, or lower alkoxy;
$R_2$ is lower alkyl and
$R_3$ is lower alkyl having 2–3 carbon atoms.

2. A dosage unit according to claim 1 in which $R_1$ is hydrogen, $R_2$ is methyl and $R_3$ is ethyl.

3. A dosage unit according to claim 1 in which said dosage unit is a tablet.

4. A dosage unit according to claim 1 in which said dosage unit is a capsule.

5. A dosage unit according to claim 2 in which said dosage unit is a tablet.

6. A dosage unit according to claim 2 in which said dosage unit is a capsule.

7. The method of producing sedative-tranquilizing activity which comprises administering internally to an animal organism in an amount sufficient to produce said activity a malonamidic acid ester of the formula:

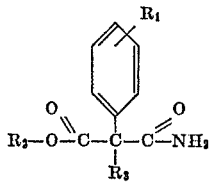

in which:
  $R_1$ is hydrogen, chloro, bromo, fluoro, trifluoromethyl, nitro, lower alkyl, or lower alkoxy;
  $R_2$ is lower alkyl and
  $R_3$ is lower alkyl having 2–3 carbon atoms.

8. The method according to claim 7 in which $R_1$ is hydrogen, $R_2$ is methyl and $R_3$ is ethyl.

9. The method according to claim 7 in which said malonamidic acid ester is administered orally in a daily dosage regimen of from about 125 mg. to about 3000 mg.

10. The method according to claim 8 in which said malonamidic acid ester is administered orally in a daily dosage regimen of from about 125 mg. to about 3000 mg.

References Cited

UNITED STATES PATENTS 3,104,201  9/1963  Testa et al. _____ 260—471

OTHER REFERENCES

Chem. Abstracts, 59, p. 3820C (1963).

ALBERT T. MEYERS, Primary Examiner

S. J. FRIEDMAN, Assistant Examiner

U.S. Cl. X.R.

260—471